S. S. MATTHES.
COLLAR SHAPING AND EDGING MACHINE.
APPLICATION FILED MAY 24, 1912.
1,157,321.
Patented Oct. 19, 1915.
2 SHEETS—SHEET 1.
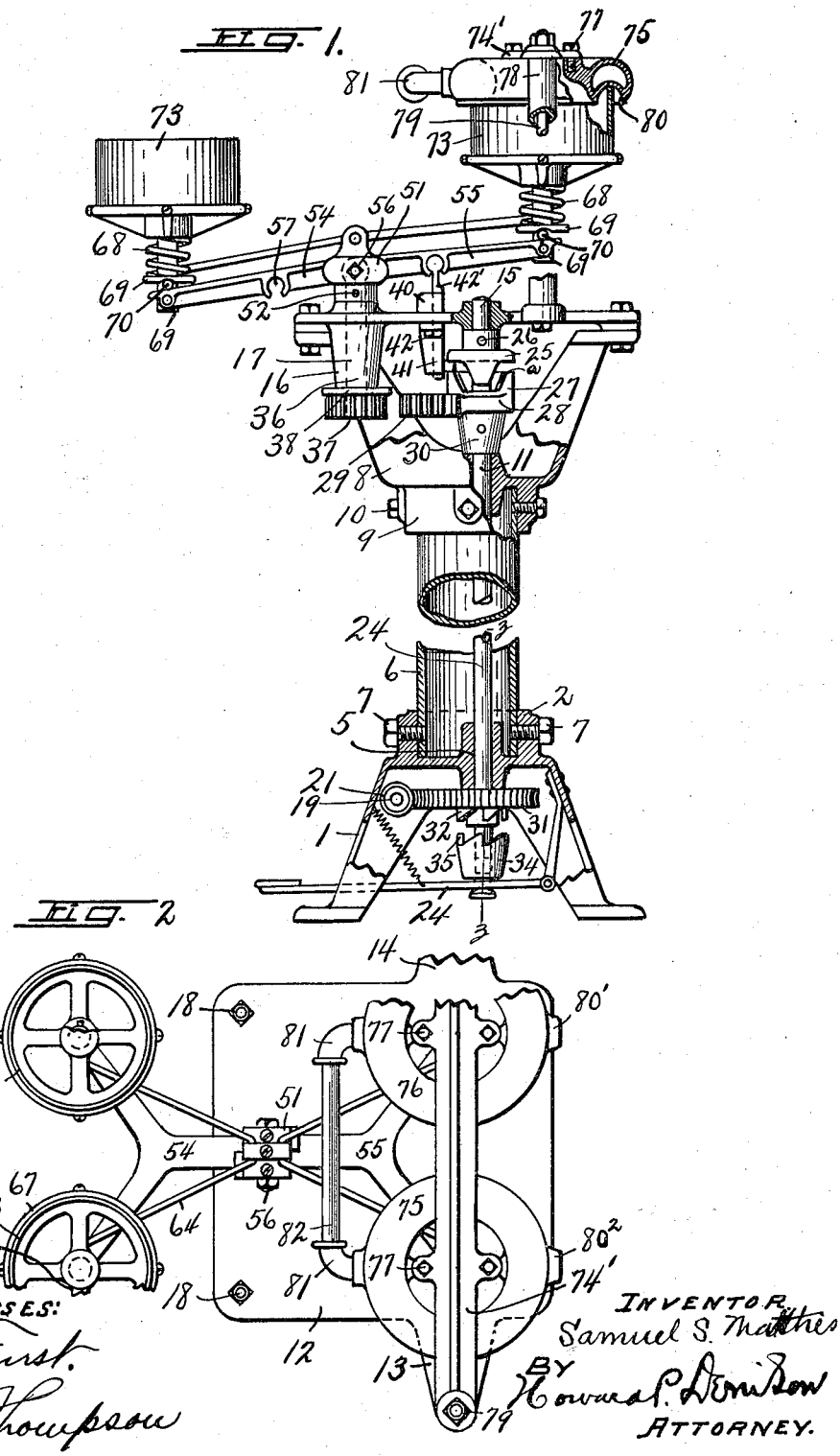

S. S. MATTHES.
COLLAR SHAPING AND EDGING MACHINE.
APPLICATION FILED MAY 24, 1912.
1,157,321.
Patented Oct. 19, 1915.
2 SHEETS—SHEET 2.
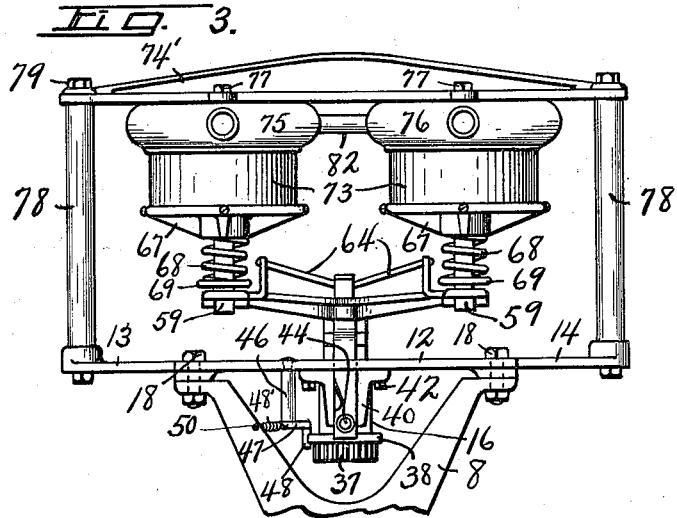
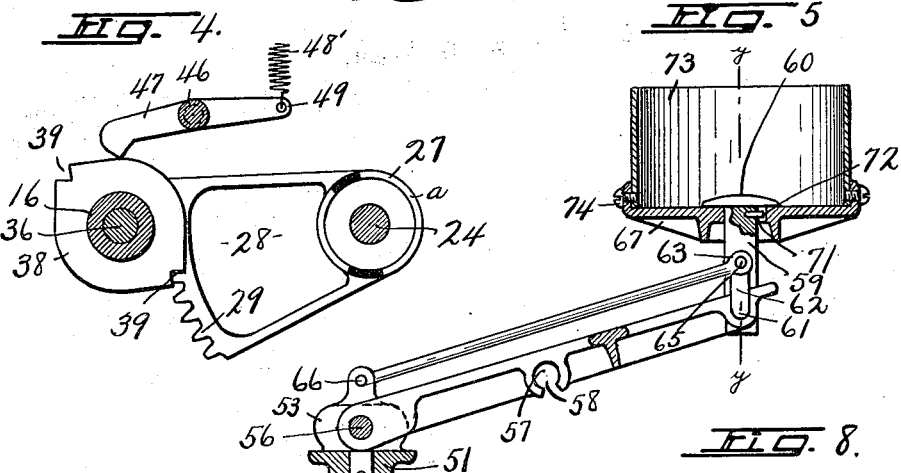
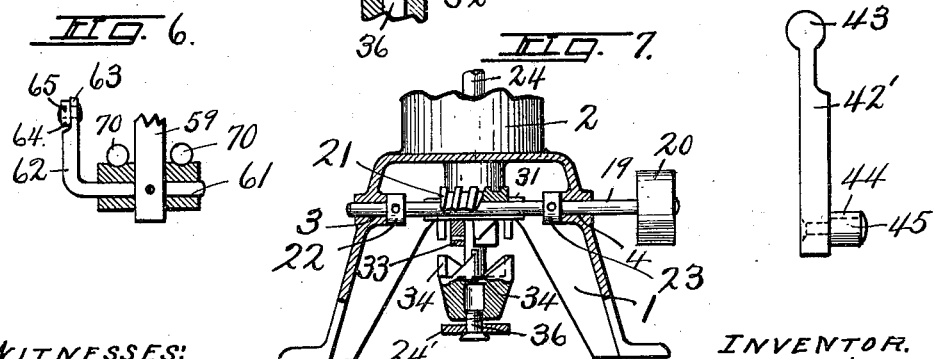
WITNESSES:
INVENTOR.
Samuel S. Matthes
BY Howard P. Denison
ATTORNEY.
COLUMBIA PLANOGRAPH CO., WASHINGTON, D. C.

UNITED STATES PATENT OFFICE.

SAMUEL S. MATTHES, OF MANSFIELD, OHIO, ASSIGNOR TO NATIONAL CHEMICAL COMPANY, OF SYRACUSE, NEW YORK, A CORPORATION OF NEW YORK.

COLLAR SHAPING AND EDGING MACHINE.

1,157,321. Specification of Letters Patent. Patented Oct. 19, 1915.

Application filed May 24, 1912. Serial No. 699,404.

*To all whom it may concern:*

Be it known that I, SAMUEL S. MATTHES, a citizen of the United States of America, residing at Mansfield, in the county of Richland and State of Ohio, have invented certain new and useful Improvements in Collar Shaping and Edging Machines, of which the following is a specification.

My invention relates to a collar shaping and edging machine for laundry use and reference is hereby made to the pending application of W. J. Quinn, Ser. No. 609,415, filed February 18, 1911, and the pending application of W. W. Quinn, Ser. No. 627,500, filed May 16, 1911, and the pending application of J. J. Seltenreich, Ser. No. 687,153. filed March 29, 1912, and no claim is made herein to the invention or inventions disclosed in any of the above identified applications.

The objects of my invention are to provide means for automatically shaping and edging collars; to prevent undue wear and tear in shaping and edging the collars; to greatly facilitate and increase the speed at which the operation of shaping and edging collars is performed; to economize in time and labor and to perform better work automatically than can be done by hand manipulation.

In the drawings, Figure 1 is a side view of the machine assembled and shown partly in section. Fig. 2 is a plan view. Fig. 3 is a rear view of the upper part of Fig. 1, showing cylinders and chests in working position. Fig. 4 is a sectional plan view taken on the line $x$ $x$ of Fig. 3, showing means to swing the cylinders to and from their working positions and a locking mechanism. Fig. 5 is a side view of a pivoted arm, showing the free end in its upper position carrying a cylinder through the medium of suitable connections, and means for maintaining the cylinder in a horizontal plane irrespective of the inclination of the arm. Fig. 6 is a sectional view taken on the line $y$, $y$, of Fig. 5, showing a bell crank and its connections. Fig. 7 is a sectional view taken on the line $z$, $z$, of Fig. 1, showing a vertical driven shaft and a driving and clutch mechanism therefor. Fig. 8 is a detail view of a sliding bar and roller which imparts vertical movement to the pivotal arms.

Referring to the drawings, reference numeral 1 represents a base having an upwardly projecting boss 2 and bearings 3, 4 and 5. The boss 2 is counterbored to receive and support one end of a pipe 6 which is rigidly secured thereto by bolts 7. A bracket 8 is provided with a counterbored boss 9 and attached to the upper or free end of the pipe 6 and held in place by the bolts 10. The bracket is also provided with a bearing 11. A plate 12 having outwardly extending arms 13 and 14, a bearing 15 and a depending portion 16, which is provided with a bearing 17, is secured to the bracket 8 by the bolts 18.

A driving shaft 19 having a pulley 20, a worm wheel 21, and set collars 22 and 23 mounted thereon, is journaled in the horizontal bearings 3 and 4. A shaft 24 is vertically journaled in the bearings 5, 11 and 15, and a cam-faced collar 25 is fastened thereto by means of a set screw 26. A cam 27, the outline of its face corresponding in contour with the face of the collar 25 and provided with an outwardly projecting portion 28 carrying teeth 29 is provided. The cam is provided with a depending portion 30 and is rigidly fastened to the shaft 24 a pre-determined distance from the face of the collar 25. A worm gear 31 having depending jaws 32 is loosely mounted on the shaft 24 and is held in position by a collar 33 which is secured to the shaft. A sleeve 34 having jaws 35 is mounted on the shaft 24 adjacent to one end. A bolt 36 provided with a chamfered head threadably engages a threaded aperture in the end of the sleeve 34 to support the treadle 24′ and operate the sleeve 34. The treadle is normally raised by a spring to hold the jaws in engagement, and the depression of the treadle separates the jaws and stops the machine.

The sleeve 34 is feather-keyed to the shaft 24 and is adapted to be reciprocated on the shaft 24 to engage and disengage the jaws 35 with the jaws 32. A standard shaft 36 is vertically supported in the bearing 17 and carries a gear 37 having an enlarged flange 38 provided with notches 39. The gear is secured to the lower end of the shaft 36 in line with the teeth of the projecting portion 28 and adapted to periodically mesh therewith. A vertical bracket 40 having a slot 41 is secured to the plate 12 by bolts 42. An actuating bar 42′ having an enlarged portion 43 at its upper end and a roller 44 secured to its lower end by a pin 45, is fitted and adapted to slide in the slot 41 of the bracket 40. A stud 46 is secured to the plate 12 carrying a pawl 47 pivotally mounted on its lower end. On one end of the pawl a lip 48 is provided and adapted to engage the notches 39 of the gear flange 38 when the same has been turned to a pre-determined position.

It will be noted that the lip of the pawl is yieldingly held in contact with the flange 38 preparatory to engaging the notch by a spring 48', one end of which is fastened to the pawl through an aperture 49 and the other end is fastened to the bracket 8 through an aperture 50. At the top end of the standard shaft 36, a supporting member 51 is secured by a pin 52 and is provided with a slot 53 which is adapted to receive one end of the arms 54 and 55 which are joined and pivotally connected thereto by a bolt 56 for vertical oscillating movement. The arm 55 is provided with an aperture 57, the lower portion of the wall being cut away to form a horizontal intersecting slot 58. It will be noted that the arm 54 has a similar aperture or opening. A supporting stud 59 provided with a head 60 is rigidly mounted on one end of a crank 61 which is journaled in each arm 55 and 54, the other end of the crank 62 is provided with an eye 63 to which one end of a rod 64 is pivotally connected by a bolt 65. The other end of the rod 64 is journaled in a bearing 66 formed at the top of the supporting member 51. A flanged disk 67 is provided with a suitable aperture to receive the supporting shaft 59 and is held in contact with the head 60 by a spring 68 which surrounds the supporting shaft 59. The lower end of the spring 68 rests upon a washer 69 which is supported by balls 70 on the end of the arm 55. A pin 71 is fixed under the head 60 of the supporting shaft 59 and is adapted to engage in a slot 72 provided in the flanged disk 67 to prevent the disk from turning.

A cylinder 73 is secured to the flanged disk 67 by screws 74. A cross bar 74' carrying steam chests 75 and 76 which are fastened thereto by bolts 77 is supported by standards 78 which are secured to and rest upon the extending arms 13 and 14 of the plate 12 and held in place by bolts 79. A groove 80 is provided in the bottom of the steam chests 75 and 76 to engage the top of cylinders 73. The steam chests 75 and 76 are heated with steam and are provided with inlet and outlet openings 80' and 80² respectively, as indicated by the arrow heads and are connected together by elbows 81 and a piece of pipe 82. The mechanism and connections of both arms and cylinders are exact duplicates, hence, only one arm, one cylinder and a connection are described.

The operation of my machine is as follows: The pulley 20 is driven by means of a belt and a rotating motion being thereby imparted to the vertical shaft 24 through the medium of worm wheel 21 and worm gear 31 by which it is connected to the drive shaft 19. The worm gear 31 being loosely mounted on the vertical shaft 24 will revolve freely unless the jaws 35 of the sleeve 34 are in engagement with the jaws 32 of the worm gear 31. The cam collar 25 and cam 27 are so arranged as to leave a suitable space or groove between their working faces to receive the roller 44 of the actuating bar 42' and permit it to move freely therein and at the same time guide and control it. The actuating bar 42' is mounted in a bracket 40 in the slot 41 of which it is free to slide in a vertical direction. The actuating bar 42' is raised and lowered by the action of the cam 27 and cam collar 25. The apertures 57 in the arms 54 and 55 are adapted to receive and engage the enlarged portion 43 of the bar 42' thereby imparting a vertical oscillating movement to the arms. The arms 54 and 55 are pivotally mounted at one end and have cylinders 73 mounted on their free ends. The cylinders are controlled by crank and parallel rod connections which retain them on a plane with the top of the machine during their upward and downward travel. When the cylinders are in contact with the steam chests with collars interposed therebetween, the roller 44 of the actuating rod 42' rides the face (a) of the cam a predetermined time before the cylinders are released from contact with the steam chest preparatory to being swung to a position for removal of the collars that have been edged and shaped and placing other collars on the cylinders for edging and shaping. It will be noted that the projecting portion 28 which carries teeth 29, is in the form of a segment and is only in mesh with the gear 37 a part of the time, thereby permitting the yielding contact of the cylinders with the steam chests as stated. The pawl 47 is actuated to stop or yieldingly lock at a pre-determined time, the rotation of the shaft 36 carrying the arms 54 and 55 and cylinders by engaging one of the notches 39 of the flange 38. The parallel bars 64 maintain the top of the cylinders parallel with the top of the machine and steam chests at all times irrespective of the inclination of the arms.

I claim:

1. In a shaping and edging machine for collars, a frame, a vertical shaft mounted on said frame, means to impart movement to said vertical shaft, pivotal arms independently mounted on said frame, automatic means to impart a vertical oscillating movement to said pivotal arms, shaping heads mounted on said frame, and collar supports mounted on the free ends of the pivotal arms to contact with said heads.

2. In a shaping and edging machine for collars, a frame, a vertical shaft mounted on said frame, means to impart movement to said vertical shaft, pivotal arms independently mounted on said frame, automatic means to impart a vertical oscillating movement to said pivotal arms, shaping heads mounted on said frame, collar supports mounted on the free ends of the pivotal arms to contact with said heads, automatic means to rotate said arms in a horizontal plane, and a clutch mechanism to throw the machine in and out of operation.

3. In a shaping and edging machine for collars, a frame, a vertical shaft mounted on said frame, means to impart movement to said vertical shaft, pivotal arms independently mounted on said frame, automatic means to impart a vertical oscillating movement to said pivotal arms, shaping heads mounted on said frame, collar supports mounted on the free ends of the pivotal arms to contact with said heads, a clutch mechanism to throw the machine in and out of operation, and automatic means to swing the pivotal arms and collar supports to and from their working positions.

4. In a shaping and edging machine for collars, a frame, a vertical shaft mounted on said frame, means to impart movement to said vertical shaft, pivotal arms independently mounted on said frame, automatic means to impart a vertical oscillating movement to said pivotal arms, shaping heads mounted on said frame, collar supports mounted on the free ends of the pivotal arms to contact with said heads, a clutch mechanism to throw the machine in and out of operation, automatic means to swing the pivotal arms and collar supports to and from their working positions, and means to yieldingly lock said collar supports in their vertical working positions for a pre-determined time.

5. In a shaping and edging machine for collars, a frame, a vertical shaft mounted on said frame, means to impart movement to said vertical shaft, pivotal arms mounted on said frame, automatic means to impart a vertical movement to said pivotal arms, automatic means to swing said arms to and from their working positions, shaping heads mounted on said frame, collar supports mounted on the free ends of the pivotal arms, and means to maintain the collar supports on a plane irrespective of the position of the pivotal arms.

6. In a shaping and edging machine for collars, a frame, a vertical shaft mounted on said frame, means to impart movement to said vertical shaft, pivotal arms independently mounted on said frame, automatic means to impart a vertical movement to said pivotal arms, shaping heads mounted on said frame, collar supports mounted on the free ends of the pivotal arms, means to maintain the collar supports on a plane irrespective of the travel of the pivotal arms, automatic means to swing the pivotal arms in a horizontal direction, and means to yieldingly lock said arms in position for a pre-determined period of time.

7. A shaping and edging machine for collars, comprising a frame, pivotal arms independently mounted on the frame, cylinders pivotally attached to the free ends of the pivotal arms, means to impart movement to said pivotal arms, shaping heads mounted on the frame, and automatic means to bring the collar supports and shaping heads into and out of working position, and means to maintain the cylinders parallel with the top of the machine as described.

8. A shaping and edging machine for collars, comprising a frame, pivotal arms independently mounted on the frame, collar supports pivotally attached to the free ends of the pivotal arms, means to impart movement to said pivotal arms, shaping heads mounted on the frame, automatic means to bring the collar supports and shaping heads into and out of working position, and parallel rods to maintain the collar supports parallel with the top of the machine.

9. In a shaping and edging machine for collars, a frame, a vertical shaft mounted on said frame, means to impart movement to said vertical shaft, pivotal arms independently mounted on said frame, automatic means to impart a vertical movement to said pivotal arms, shaping heads mounted on said frame, collar supports mounted on the free ends of the pivotal arms, means to maintain the collar supports parallel with the steam chests irrespective of the travel of the pivotal arms, and automatic means to swing said pivotal arms and collar supports to and from their working positions.

10. In a shaping and edging machine for collars, a frame, a vertical shaft mounted on said frame, means to impart movement to said vertical shaft, pivotal arms independently mounted on said frame, automatic means to impart a vertical movement to said pivotal arms, collar supports mounted on said arms, means to maintain the collar supports parallel irrespective of the travel of the pivotal arms, automatic means to swing said pivotal arms and collar supports to and from their working positions and maintain said collar supports in their working position a pre-determined time.

11. A collar edging and shaping machine, comprising a frame, a vertical shaft mounted on said frame, means to impart movement to said vertical shaft, a cam carrying a projecting portion with teeth mounted on said vertical shaft, a standard shaft mounted on the frame, a gear mounted on said shaft, a supporting member mounted on said standard shaft, arms pivotally attached to said supporting member, collar supports mounted on the free ends of said pivotal arms, a cross-bar, standards to support said cross-bar, shaping heads suspended from said cross-bar, and means to impart a vertical oscillating movement to the arms carrying the collar supports forcing them in and out of contact with the shaping heads.

12. A collar edging and shaping machine, comprising a frame, a vertical shaft mounted on said frame, means to impart movement to said vertical shaft, a cam carrying a projecting portion with teeth mounted on said vertical shaft, a standard shaft mounted on the frame, a gear mounted on the shaft, a supporting member mounted on said standard shaft, arms pivotally attached to said supporting member, collar supports mounted on the free ends of said pivotal arms, a cross-bar, standards to support said cross-bar, shaping heads suspended from said cross-bar, means to impart a vertical oscillating movement to the arms carrying the collar supports forcing them in and out of contact with the shaping heads, parallel rods connected to the supporting member, cranks connected to the studs carrying the collar supports and to the parallel rods whereby the collar supports are maintained in a horizontal plane irrespective of the vertical travel of the pivotal arms upon which they are mounted.

13. A shaping and edging machine for collars, comprising a frame, pivotal arms independently mounted on the frame, collar supports pivotally attached to the free ends of the pivotal arms, automatic means to impart a vertical movement to said pivotal arms, shaping heads mounted on the frame, and automatic means to bring the collar supports and shaping heads into and out of working position as described.

14. A shaping and edging machine for collars comprising a frame, a vertical shaft mounted in said frame, a standard mounted on said frame, arms independently pivoted on said standard, automatic means to impart vertical movement to said arms, collar supports mounted on the free ends of said arms, shaping heads mounted on the frame, and means to impart a horizontal swinging movement to said arms, as and for the purpose described.

15. A shaping and edging machine for collars comprising a frame, arms pivoted to said frame independently of each other, collar supports yieldingly mounted on the free extremities of said arms, shaping heads mounted on said frame, and automatic means to swing said arms horizontally to and from their working positions.

16. A shaping and edging machine for collars comprising a frame, arms pivoted to said frame independently of each other, collar supports yieldingly mounted on the free extremities of said arms, shaping heads mounted on said frame, automatic means to swing said arms horizontally to and from their working positions, and automatic means to impart a vertical movement to said arms.

17. A shaping and edging machine for collars comprising a frame, arms pivoted to said frame independently of each other, collar supports yieldingly mounted on the free extremities of said arms, shaping heads mounted on said frame, automatic means to swing said arms horizontally to and from their working positions, automatic means to impart a vertical movement to said arms, and automatic means to keep the plane of the collar supports on a plane with the shaping heads.

18. A shaping and edging machine for collars comprising a frame, arms pivoted to said frame independently of each other, collar supports yieldingly mounted on the free extremities of said arms, shaping heads mounted on said frame, automatic means to swing said arms horizontally to and from their working positions, automatic means to impart a vertical movement to said arms, automatic means to keep the planes of the collar supports parallel with the plane of the shaping heads, and automatic means to stop and lock said swinging arms and collar supports in alinement with the shaping heads.

19. A shaping and edging machine for collars comprising a frame, arms pivoted to said frame independently of each other, collar supports pivotally and yieldingly mounted on the free extremities of said arms, shaping heads mounted on said frame, and means to impart a vertical movement to said arms and means to swing said arms to and from their working position.

20. A shaping and edging machine for collars comprising a frame, arms pivoted to said frame independently of each other, collar supports pivotally and yieldingly mounted on the free extremities of said arms, shaping heads mounted on said frame, and automatic means to impart a vertical movement to said arms and automatic means to swing said arms to and from their working position.

21. A shaping and edging machine for collars comprising a frame, arms pivotally mounted on said frame, collar supports yieldingly and pivotally mounted on the extremities of said arms, shaping heads mounted on the frame, and automatic means to impart a vertical and horizontal movement to said arms to bring the collar supports in and out of working position with the shaping heads.

22. In a shaping and edging machine for collars, a frame, a pivotal arm mounted on said frame, means to impart a vertical oscillating movement to said arm, a shaping head having an annular groove in its under side, a collar support mounted on the free end of the pivotal arm and adapted during the oscillating movement of said arm to be brought into pressing coaction with the socket in the head.

23. A collar edging and shaping machine comprising a frame, a vertical shaft mounted on said frame, means to impart rotary movement to said vertical shaft, a segmental gear mounted on said shaft, a standard shaft mounted on the frame, a gear mounted on the standard shaft and meshing with the segmental gear upon the vertical shaft, a supporting member mounted on said standard shaft, arms extending radially from said supporting member, collar supports mounted on said arms, collar shaping heads mounted on said frame, and means for bringing said collar supports and collar shaping heads into pressing co-action.

24. A collar edging and shaping machine comprising a frame, a vertical shaft mounted on said frame, means to impart rotary movement to said vertical shaft, a standard shaft mounted on the frame, said vertical shaft and said standard shaft provided with co-acting means for intermittingly rotating the standard shaft, a supporting member mounted on the standard shaft and comprising arms extending radially therefrom, collar supports mounted on said arms, collar shaping heads having annular grooves adapted to receive the ring with the collar thereon to mold the collar, and means for bringing the rings into interfitting relation with the grooves in the heads.

25. In a collar shaping and edging machine, a shaping head having a socket, a collar support, means carrying said collar support, a spring interposed between the collar support and its carrying means, said means rotatable about an axis at one side of the head to move the support into and out of registration with the head, a cam, an actuating bar including a roller adapted to contact with said cam, whereby rotation of the cam causes a vertical movement of said bar, said bar in its vertical movement adapted to contact with the means carrying said collar support to move the same vertically and thereby bring the collar support into interfitting relation with the socket in the head under resilient pressure of said spring.

In testimony whereof I affix my signature in presence of two witnesses.

SAMUEL S. MATTHES.

Witnesses:
 DOROTHY WENDLAND,
 ELIZABETH KIPP.

Copies of this patent may be obtained for five cents each, by addressing the "Commissioner of Patents, Washington, D. C."